US012549996B2

(12) United States Patent
Reeves et al.

(10) Patent No.: US 12,549,996 B2
(45) Date of Patent: Feb. 10, 2026

(54) CELL OUTAGE COMPENSATION OPTIMIZATION

(71) Applicant: T-Mobile Innovations LLC, Overland Park, KS (US)

(72) Inventors: Raymond E. Reeves, Orlando, FL (US); Pablo Lopez, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 337 days.

(21) Appl. No.: 18/321,134

(22) Filed: May 22, 2023

(65) Prior Publication Data

US 2024/0397369 A1 Nov. 28, 2024

(51) Int. Cl.
*H04W 28/02* (2009.01)
*H04W 24/04* (2009.01)
*H04W 28/06* (2009.01)

(52) U.S. Cl.
CPC ....... *H04W 28/0236* (2013.01); *H04W 24/04* (2013.01); *H04W 28/06* (2013.01)

(58) Field of Classification Search
CPC . H04W 28/0236; H04W 24/04; H04W 28/06; H04W 24/02; H04W 24/08
USPC .......................................................... 370/329
See application file for complete search history.

(56) References Cited

U.S. PATENT DOCUMENTS

| 9,363,727 | B2 | 6/2016 | Chou et al. |
| 9,516,629 | B2 | 12/2016 | Amirijoo et al. |
| 10,498,613 | B2* | 12/2019 | Zhao ................. H04W 36/0061 |
| 2013/0244644 | A1* | 9/2013 | Amirijoo ............. H04W 24/04 |
| | | | 455/424 |
| 2014/0140278 | A1* | 5/2014 | Chou ....................... H04L 5/14 |
| | | | 370/328 |
| 2015/0215927 | A1* | 7/2015 | Amirijoo ............ H04W 72/542 |
| | | | 370/329 |
| 2019/0014487 | A1* | 1/2019 | Yang ...................... G06N 3/084 |
| 2024/0298225 | A1* | 9/2024 | Hyde ................ H04W 36/0083 |

* cited by examiner

*Primary Examiner* — Kwang B Yao
*Assistant Examiner* — Syed M Bokhari
(74) *Attorney, Agent, or Firm* — Jones Robb, PLLC (57) ABSTRACT

Systems, methods and devices are provided for cell outage compensation optimization. Methods include monitoring, by a cell outage compensation analyzer, events between wireless devices and an access node deploying a cell within a radio access network. The method additionally includes determining relevant events indicative of a cell outage from the monitored events and forwarding forwarding the relevant events to a cell outage compensation optimization agent within a core network. The method additionally includes generating, at the cell outage compensation optimization agent, a real time status of the cell based on the events and providing an approval at the cell outage compensation optimization agent prior to allowing performance of cell outage compensation procedures.

20 Claims, 8 Drawing Sheets

CELL OUTAGE COMPENSATION OPTIMIZATION

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages. For example, 5G networks provide edge deployments enabling computing capabilities closer to UEs.

With the newer technologies, network operators have implemented self-organizing networks (SON) to minimize costs by eliminating manual configuration of network elements. The use of SON has resulted in many benefits including, but not limited to accelerated 5G NR and LTE RAN (Radio Access Network) rollout times, simplified network upgrades, fewer dropped calls, improved call setup success rates, and higher end user throughput.

SON is an automation technology designed to make the planning, configuration, management, optimization, and healing of mobile RANs simpler and faster. SON has been codified within 3GPP Release 8 and subsequent specifications in a series of standards. Self-healing mechanisms can be triggered to temporarily compensate for a detected equipment outage, while awaiting a more permanent solution Accordingly, existing 4G and 5G networks include a network health process for cell outage compensation (COC) that is periodically executed as part of network automation, a.k.a. closed-loop execution. This process consumes automatic periodic reports generated on a regular basis, e.g., daily, that include reporting snapshots for the network components.

One such report indicates whether any particular cell is found to be in an outage condition. In response to the report, the COC processes attempt to compensate for the reported outage, e.g. increase coverage area. However, problems have arisen with this approach. During recent California natural disasters stemming from the atmospheric rivers that resulted in flooding and mudslides, the COC process negatively impacted the service experience for a large number of customers because the reconfiguration process was fed with faulty cell outage information due to including corrupted, outdated, and/or incomplete data. Thus, COC processes were halted or closely supervised by human operators and the benefits were largely diminished.

Accordingly, a solution is needed for overcoming the deficiencies of existing COC processes enabling them to operate automatically without constant supervision.

Overview

Exemplary embodiments described herein include systems, methods, and processing nodes for optimizing cell outage compensation (COC) processes. A method includes monitoring, by a first analyzer, events between wireless devices and an access node deploying a cell within a radio access network (RAN). The method further includes determining, by the first analyzer, relevant events from the monitored events, the relevant events indicative of a cell outage and forwarding the relevant events to a cell outage compensation (COC) optimization agent. The method additionally includes generating, at the COC optimization agent, a real time status of the cell based on the events and providing an approval at the COC optimization agent prior to allowing performance of COC procedures.

An additional exemplary method includes providing, within a wireless network, multiple distributed cell outage compensation (COC) analyzers, each COC analyzer having a processor for monitoring events between wireless devices and an access node and identifying relevant events from the monitored events, wherein the relevant events are indicative of a cell outage. The method additionally includes providing a COC optimization agent disposed, the COC optimization agent receiving the relevant events from the COC analyzers and generating a real time status based on the relevant events. The method further includes evaluating requested COC procedures based on the real time status.

An additional exemplary embodiment includes a system for optimizing COC processes. The system include multiple distributed COC analyzers, each COC analyzer having a processor performing multiple operations. The operations include monitoring events between wireless devices and an access node and identifying relevant events from the monitored events, wherein the relevant events are indicative of a cell outage. The system additionally includes a COC optimization agent in communication with the COC analyzer. The COC optimization agent performs operations including receiving the relevant events from the COC analyzers, generating a real time status based on the relevant events, and evaluating requested COC procedures based on the real time status.

DETAILED DESCRIPTION

Exemplary embodiments described herein include systems, methods, and devices for optimizing cell outage compensation procedures in a self-organizing network (SON). Embodiments provided herein modify existing network processes and components to support a constantly optimized cell outage agent (COCOA) architecture whereby existing processes triggered either manually with human monitoring or infrequently scheduled with potentially corrupted, outdated and/or incomplete data are automatically and systematically examined for verification and approval based on real-time systems monitoring information.

A cell outage compensation optimization (COC) system disclosed herein serves as fail-safe quality assurance with veto and amendment power over any COC execution request. The COC optimization system allows for network reconfiguration in response to execution requests based upon examination of currently available real time data for a target cell that is alleged to be experiencing an outage.

In order to develop a COCOA architecture and transform the existing COC processes, the COC optimization system is provided that has access to real-time protocol analysis feeds reflecting real-time network signaling messages associated with any and all network components, e.g. nodes, cells, etc., in both the RAN and the core network.

Depending on the particular embodiment or technology, the COC optimization system includes at least one COC analyzer and a COC agent. The COC analyzer may be manifested in distributed instances proximal to RAN nodes or at the core and communicating with the RAN nodes. The COC analyzer is able to access real-time highly distributed event streaming services as well as protocol file snapshots, e.g. protocol analysis dumps, translated into events for streaming services. In some embodiments, each COC analyzer may be coupled with a COC agent that receives information from the COC analyzer and evaluates COC requests based on the information. In other embodiments, multiple COC analyzers may provide information from various locations within a network to a single COC agent.

In embodiments set forth herein, distributed COC optimization systems are positioned for high-efficiency performance through administrative filtering or messaging to reduce the existing monitoring workload on system components, thereby decreasing resource demands and improving performance for real-time COC execution approvals. Currently, COC schedulers trigger COC actions by blindly processing a cell impact request irrespective of real-time state. As noted above, the COCOA architecture improves network performance and customer experience with increased reliability by way of extending real-time network intelligence into existing static and outdated systems and processes.

Through the use of systems, methods, and devices described herein, existing COC processes are improved through structures utilizing real-time data and analysis of the data to ensure that COC procedures are warranted. The systems and methods disclosed herein further facilitate prompt implementation of COC procedures when required.

Figure 1:
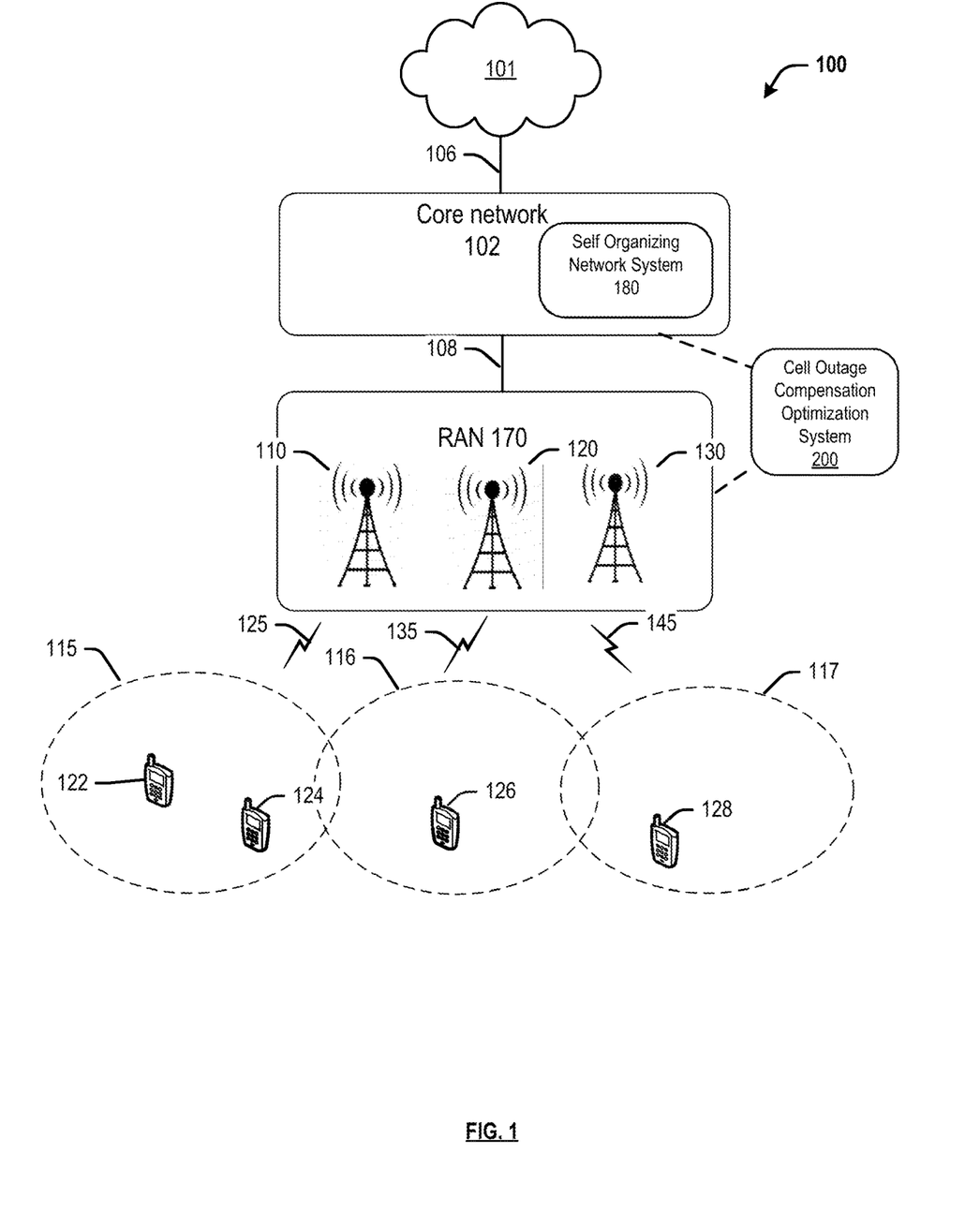
FIG. 1 depicts an exemplary operating environment system for employing a cell outage compensation optimization system in accordance with the disclosed embodiments.

FIG. 1 depicts an exemplary system 100 for wireless communication, in accordance with the disclosed embodiments. The system 100 may include a communication network 101, core network 102, and a radio access network (RAN) 170 including access nodes 110, 120, and 130. The RAN 170 may include other devices and additional access nodes. Although three access nodes are shown, any number of access nodes may be included.

The system 100 also includes multiple wireless devices 122, 124, 126, and 128, which may be end-user wireless devices and may operate within one or more coverage areas 115, 116, and 117 and communicate with access nodes 110, 120, or 130 within the RAN 170 over communication links 125, 135, and 145 which may for example be 5G NR communication links. Communication links 125, 135, and 145 may additionally include, for example, 4G LTE communication links, or any other suitable type of communication link.

The system 100 may further include a cell outage compensation (COC) optimization system 200, which is illustrated as operating between the core network 102 and the RAN 170. However, it should be noted that the COC optimization system 200 may be distributed. For example, the COC optimization system 200 may utilize components located at both the core network 102 and at the multiple access nodes 110, 120, 130. Alternatively, the COC optimization system 200 may be an entirely discrete system operating within the core or between the core network 102 and the RAN 170 or within the RAN 170.

The COC optimization system 200 receives information pertaining to signal strength, signal quality and interference for wireless devices within a coverage area. For example, the COC optimization system 200 may receive RSRP, RSRQ, and/or SINR measurements to name a few parameters. The wireless devices 122, 124, 126, and 128 further may send this information to the COC optimization system 200 or alternatively the COC optimization system 200 may receive this information from the SON 180 or from other components to be described herein.

The COC optimization system 200 analyzes this information to determine current cell conditions for multiple cells or for coverage areas 115, 116, and 117 to determine real-time cell conditions. For example, the COC optimization system 200 may determine that the access node 120 is experiencing an outage. As a result of that determination, the COC optimization system 120 may approve a request to modify parameters for access nodes 110 and 130 to expand the coverage areas 115 and 117 in order to serve wireless devices, such as the wireless device 126, which previously served by the access node 120. For example, parameters of the access nodes 110 and 130 may be modified to adjust coverage areas 115 and 117 to compensate for the loss of the coverage area 116. The parameters may include, for example, handover thresholds, transmit power of the access nodes requiring increased coverage, and antenna adjustments. In many cases, COC compensation focuses on a on change of antenna pattern to achieve additional coverage for a neighboring access node experiencing an outage. Parameters such as antenna tilt and beam width adjustment can improve coverage in certain areas. However, the SON 180 needs to ensure that the adjustment does not worsen coverage or create excess interference in another area.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network 102 may have an evolved packet core (EPC) structure or may be structured using a service-based architecture (SBA). The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QOS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 122, 124, 126, 128 and is responsible for handling connection and mobility management tasks. The SMF is primarily responsible for creating updating and removing sessions and managing session context. The UDM function provides services to other core functions, such as the AMF, SMF, and NEF. The UDM function may function as a stateful message store, holding information in local memory. The NSSF can be used by the AMF to assist with the selection of network slice instances that will serve a particular device. Further, the NEF provides a mechanism for securely exposing services and features of the core network.

Further, the core network 102 includes a self-organizing network (SON) 180. The SON 180 implements an automation technology designed to make the planning, configuration, management, optimization and healing of mobile radio access networks simpler and faster. When the SON 180 is implemented, newly added base stations or access nodes should be self-configured in line with a "plug-and-play" paradigm while all operational base stations will regularly self-optimize parameters and algorithmic behavior in response to observed network performance and radio conditions.

Self-healing is a function of the SON 180. Self-healing mechanisms can be triggered to temporarily compensate for a detected equipment outage, while awaiting a more permanent solution. In embodiments set forth herein, the COC optimization system 200 optimizes the self-healing process of the SON 180. When some nodes in the network become inoperative, self-healing mechanisms aim at reducing the impacts from the failure, for example by adjusting parameters and algorithms in adjacent cells so that other nodes can support the users that were supported by the failing node. In legacy networks, failing base stations can be difficult to identify and a significant amount of time and resources are required for identification and remediation. Thus, the SON 180, in combination with the COC optimization system 200 facilitates identification of failing access nodes so that remediation measures can take place in order to minimize degradation of service for the users of the wireless devices 122, 124, 126, and 128.

Communication links 106 and 108 can use various communication media, such as air, space, metal, optical fiber, or some other signal propagation path-including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links may use electromagnetic waves in the radio frequency (RF), microwave, infrared (IR), or other wavelength ranges, and may use a suitable communication protocol, including but not limited to Global System for Mobile telecommunications (GSM), Code Division Multiple Access (CDMA), Worldwide Interoperability for Microwave Access (WiMAX), Multimedia Broadcast Multicast Service (MBMS), Single-Carrier Radio Transmission Technology (1×RTT), Universal Mobile Telecommunications System (UMTS), High Speed Packet Access (HSPA), Evolution-Data Optimized (EV-DO), EV-DO rev. A, 3GPP LTE, WiMAX, 4G including LTE Advanced and the like, and 5G including 5G NR or 5G Advanced, 6G, NTN, or combinations thereof.

Communication links 106 and 108 can be direct links or might include various equipment, intermediate components, systems, and networks, such as a cell site router, etc. Communication links 106 and 108 may comprise many different signals sharing the same link. Communication links 106 and 108 may be associated with many different reference points, such as N1-Nxx, as well as S1-Sxx, etc.

The RAN 170 may include various access network systems and devices such as access node 110, 120, 130. The RAN 170 is disposed between the core network 102 and the end-user wireless devices 122, 124, 126, 128. Components of the RAN 170 may communicate directly with the core network 102 and others may communicate directly with the end user wireless devices 122, 124, 126, 128. The RAN 170 may provide services from the core network 102 to the end-user wireless devices 122, 124, 126, and 128.

The RAN 170 includes multiple access nodes (or base stations) 110, 120, 130, which may include an eNodeB or a next generation NodeB (gNodeB) 110 communicating with the plurality of end-user wireless devices 122, 124, 126, 128. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB. The RAN 170 may further comprise a non-terrestrial network (NTN) serving the multiple UEs by a radio frequency transmission provided by utilizing orbiting satellites that may be in communication with access nodes of a terrestrial network TN. The satellites may include geosynchronous equatorial orbit (GEO) satellites, Medium Earth Orbit (MEO) satellites, and low Earth orbit (LEO) satellites. The NTN may include NTN nodes that are not stationed on the ground.

Access nodes 110, 120, 130 can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110, 120, 130 may comprise a short range, low power, small-cell access node such as a microcell access node, a picocell access node, a femtocell access node, or a home eNodeB device. As will be further described below, functionality for tagging requests from wireless devices may be included within the access nodes. Access nodes 110, 120, 130 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110, 120, 130 can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, in embodiments set forth herein, the access nodes 110, 120, 130 are able to interact with the COC optimization system 200 to report real time cell conditions.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. In embodiments disclosed herein, the wireless devices 122, 124, 126, and 128 may be equipped with particular processing components to report relevant information to the COC optimization system 200, such as device location and performance parameters.

Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. The wireless devices 122, 124, 126 128 may be or include high power wireless devices or standard power wireless devices. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for COC optimization may be implemented as computer-readable instructions or methods, and processing nodes on the network for executing the instructions or methods. The processing node may include a processor included in the access node or a processor included in any controller node in the wireless network that is coupled to the access node.

Figure 2:
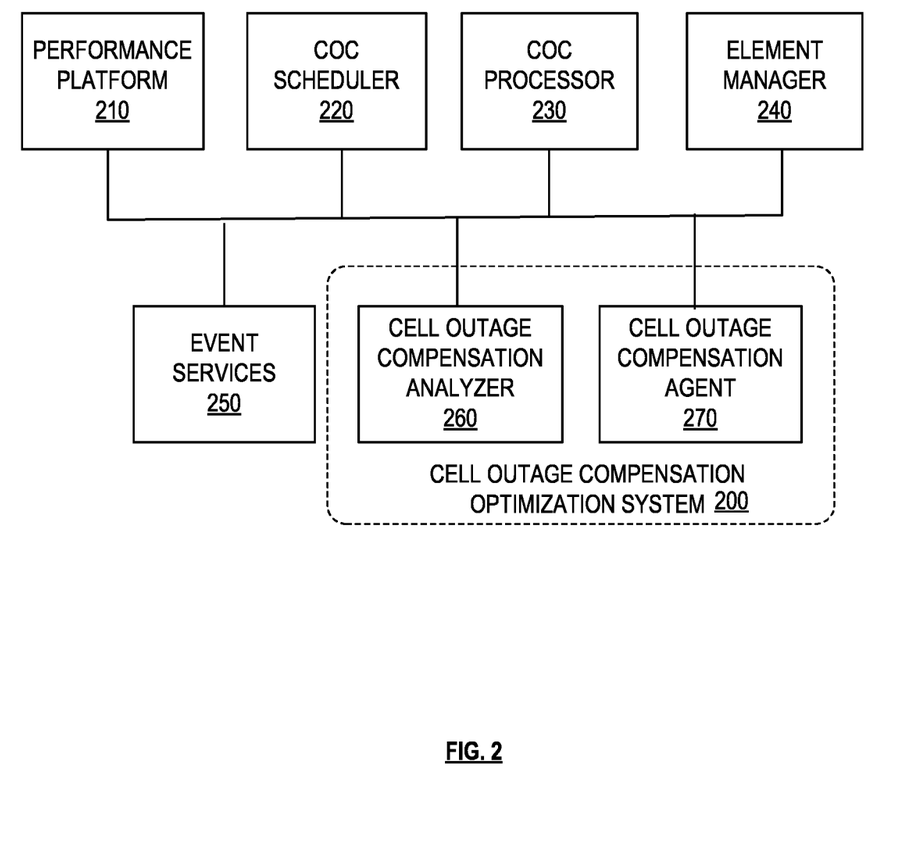
FIG. 2 illustrates an additional exemplary operating environment for a cell outage compensation optimization system in accordance with disclosed embodiments.

FIG. 2 depicts an exemplary SON system environment 180 for use with a wireless communication network, in accordance with the disclosed embodiments. The SON system 180 may include a performance platform 210, a COC scheduler 220, a COC processor 230, an element manager 240, and event services 250. In embodiments disclosed herein, the SON system 180 may also be connected with the COC optimization system 200.

The COC optimization system 200 may include, for example, a COC analyzer 260 and a COC optimization agent 270. Although the COC analyzer 260 and the COC optimization agent 270 are shown as coupled components, the SON system 180 may be interconnected with multiple distributed COC systems 200 or with multiple distributed COC analyzers 260 connected with a centralized COC optimization agent 270 or vice versa.

For example, a first COC analyzer 260 may be located in the RAN 170 proximal to a first access node 110 and may receive events monitored by a RAN probe. A second COC 260 may be disposed proximal to a second access node 120 and may receive events monitored by another RAN probe between the second access node and wireless devices within range of the second access node. The first and second COC analyzers 260 filter the events and forward the relevant events to the COC optimization agent 270. Further, a third COC analyzer 260 may be located in the core network, and may receive events between multiple wireless devices and multiple access nodes. The third COC analyzer 260 may determine relevant events from the monitored events and forward the relevant events to a COC optimization agent 270 within the core network. The third COC analyzer 260 may, for example, monitor events detected by a core network probe. These scenarios are merely exemplary, as any locations or configurations of the COC analyzer 260 and COC optimization agent 270 are within scope of the disclosure.

In operation, components of the SON system 180 may interact with the COC optimization system 200. This interaction will be further described with reference to FIG. 8. Without the COC optimization system 200 described herein, the SON 180 performs COC procedures which may detrimentally impact the performance of the wireless devices in the network. For example, the performance platform 210 generates reports periodically that may be corrupted or lack data. The reports are not generated in real time. The performance platform 210 collects coarse performance metrics, e.g., amount of traffic in a cell, which is not necessarily indicative of an outage.

Accordingly, embodiments provided herein add the COC optimization system 200, which supervises any efforts to initiate cell outage compensation procedures from the SON system 180. Thus, COC scheduler 220, which traditionally orders cell outage compensation procedures is equipped with stored logic, that when executed by a processor requires the COC scheduler 220 to seek approval from the COC optimization system 200 prior to ordering cell outage compensation procedures. The COC optimization system 200 could reject, approve, or partially approve request from the COC scheduler 220 after asserting a best course of action based on real-time details acquired though optimized COC analyzers 260, which may be adapted to particular vendor and/or technology embodiments:

Thus, through the above-described interaction, existing processes triggered either manually with human monitoring or infrequently scheduled with potentially corrupted, outdated and/or incomplete data are automatically and systematically verified and approved based on real-time systems monitoring information that serves as fail-safe quality assurance. The COC optimization system 200 has veto and amendment power over any COC execution request. Thus, the COC optimization system 200 allows network reconfiguration only when it grants approval for a request impacting any target cell and group of target cells. A goal of the COC optimization system 200 is to approve changes to network configuration based on information that is accurate. The COC optimization system 200 ensures that fewer customers are detrimentally impacted by avoiding huge overlaps, oversubscription and ping-ponging.

Specifically, the COC analyzer 260 ensures that information obtained is relevant and the COC optimization agent 270 makes decisions based only on the relevant information. Whenever the COC scheduler 220 makes a request for a configuration change, the COC optimization agent 270 implements its real time knowledge to ensure that an outage genuinely exists. Ultimately, when changes are approved by the COC system 200, the element manager 240 implements the changes, for example by increasing or decreasing antenna tilt or changing beam width to cover a larger territory.

Figure 3:
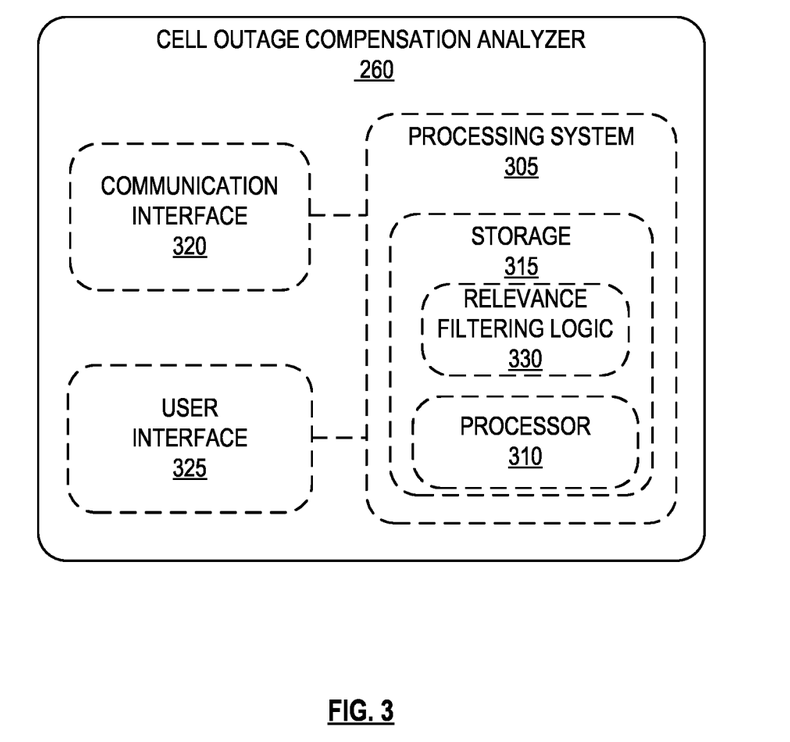
FIG. 3 illustrates a component of a cell outage compensation optimization system in accordance with disclosed embodiments.

FIG. 3 depicts an exemplary COC analyzer 260, which may be configured to perform the methods and operations disclosed herein to make real time status updates regarding pertinent cell outage events within the COC optimization system 200. In the disclosed embodiments, the COC analyzer 260 may be located within the core network 102. Alternatively or additionally, a COC analyzer 260 may be located adjacent to or be integrated with each access node 110, 120, 130. As yet a further alternative, multiple COC analyzers 260 may be provided to cover different areas. For example, one COC analyzer 260 may serve two or more coverage areas 115, 116. As yet a further alternative, the COC analyzer 260 may be integrated with the COC optimization agent 270 in the core network 102 or multiple integrated COC optimization systems 200 may be provided for serving different coverage areas 115, 116, 117.

The COC analyzer 260 may be configured for determining relevant events that reflect an outage based on information collected pertaining to communications between wireless devices 122, 124, 126, and 128. To detect relevant events, the COC analyzer 260 may include a processing system 305 including a storage area 315 and a processor 310. The storage device 315 may store relevance filtering logic 330. The relevance filtering logic 330 may include computer readable instructions to assist in distinguishing between relevant and irrelevant events with respect to a potential outage. For example, if all devices in a coverage area report a loss of signal within a predetermined time period, this may represent a relevant event. If some devices report interference or a weak signal, these may be filtered as irrelevant events.

Storage device 315 may include a disk drive, a flash drive, a memory, or other storage device configured to store data and/or computer readable instructions or codes (e.g., software). The computer executable instructions or codes may be accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. For example, instructions may be provided to monitor and analyze wireless device performance, location, and movement over time to determine the relevance of events to a potential outage. Processor 310 may be a microprocessor and may include hardware circuitry and/or embedded codes configured to retrieve and execute software stored in storage device 315.

The COC analyzer 260 may include a communication interface 320 and a user interface 325. Communication interface 320 may be configured to enable the processing system 305 to communicate with other components, nodes, or devices in the wireless network. For example, the COC analyzer 260 can share the events filtered as relevant with the COC optimization agent 270. The COC analyzer 260 may have access to real-time protocol analysis feeds reflecting real-time network signaling messages associated with any and all network components, e.g. nodes, cells, etc. The COC analyzer 260 may further have access to real-time highly distributed event streaming services as well as protocol file snapshots, e.g. protocol analysis dumps, translated into events for streaming services.

Communication interface 320 may include hardware components, such as network communication ports, devices, routers, wires, antenna, transceivers, etc. User interface 325 may be configured to allow a user to provide input to the COC analyzer 260 and receive data or information from other components, such as for example, the event services component 250 shown in FIG. 2. User interface 325 may include hardware components, such as touch screens, buttons, displays, speakers, etc. The COC analyzer 260 may further include other components such as a power management unit, a control interface unit, etc.

The COC analyzer 260 thus may utilize the memory 315 and the processor 310 to perform multiple operations. For example, the processor 310 may access stored instructions in the memory 310 to determine when events reported by wireless devices are relevant or irrelevant to a potential outage of an access node.

The location of the COC analyzer 260 may depend upon the network architecture. For example, in smaller networks, a COC analyzer 260 may be paired with a COC optimization agent 270 and may communicate with the event services component 250 in order to filter events as relevant or irrelevant to a cell outage. However, in a larger network, multiple COC analyzers 260 may be required to cover the network and the COC analyzers 260 may be disposed in the vicinity of access nodes such as 110, 120, 130.

Figure 4:
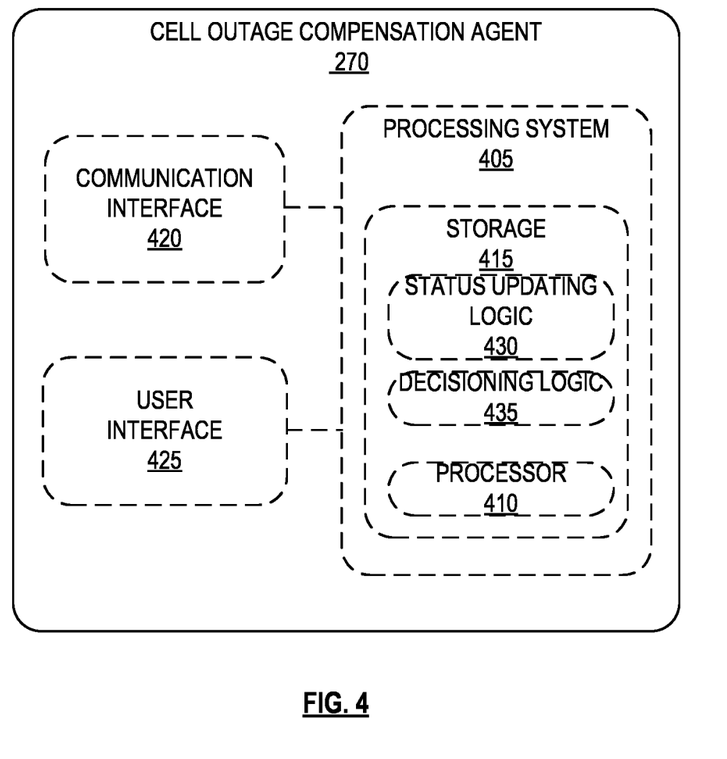
FIG. 4 depicts an additional component of a cell outage compensation optimization system in accordance with disclosed embodiments.

FIG. 4 depicts an exemplary COC optimization agent 270 in communication with the COC analyzer 260. The COC optimization agent 270 may be configured to perform the methods and operations disclosed herein to receive relevant events from the COC analyzer 260 and to generate a real-time network status based on the received relevant events. In some embodiments, the COC optimization agent 270 may receive relevant events from multiple COC analyzers 260 covering different portions of a wireless network. In other embodiments, multiple COC agents 270 may receive relevant events from corresponding COC analyzers 260. In the disclosed embodiments, one or more COC agents 270 may be integrated with the core network 102, or may be an entirely separate component capable of communicating with multiple COC analyzers 260.

The COC optimization agent 270 may be configured for updating real time network status, and further for receiving COC execution requests. For example, the COC scheduler 220 may request permission from the COC optimization agent 270 to perform cell outage compensation operations, such as for example, adjusting antenna tilt or adjusting transmission power at an access node. In response, the COC optimization agent 270 may make a decision on the request and transmit the decision to the COC scheduler 220.

To reach a decision on a request, the COC optimization agent 270 may utilize a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes may be accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. For example, instructions may be provided to process relevant events received from the COC analyzer 260 with status updating logic 430. Further, decisioning logic 435 may be provided for rendering a permission decision based on a received request and the relevant events. Processor 410 may be a microprocessor and may include hardware circuitry and/or embedded codes configured to retrieve and execute software stored in storage device 415.

The COC optimization agent 270 may include a communication interface 420 and a user interface 425. Communication interface 420 may be configured to enable the processing system 405 to communicate with other components, nodes, or devices in the wireless network. For example, the COC optimization agent 270 receives relevant events from the COC analyzer 260 and also communicates with the COC scheduler 220 to receive permission requests and transmit a decision.

Communication interface 420 may include hardware components, such as network communication ports, devices, routers, wires, antenna, transceivers, etc. User interface 425 may be configured to allow a user to provide input to the COC optimization agent 270 and receive data or information from the COC optimization agent 270. User interface 425 may include hardware components, such as touch screens, buttons, displays, speakers, etc. The COC optimization agent 270 may further include other components such as a power management unit, a control interface unit, etc.

The COC optimization agent 270 thus may utilize the memory 415 and the processor 410 to perform multiple operations. For example, the processor 410 may access stored instructions in the memory 410 to determine if the requested compensation measures such as antenna adjustment and transmission power adjustment should be performed. For example, the COC optimization agent 270 makes the decision based on a real time network status and further in manner to avoid negatively impacting devices within the wireless network.

The location of the COC optimization agent 270 may depend upon the network architecture. For example, in smaller networks, a single COC agent may be disposed for communication with a single COC analyzer 260. However, in a larger network, one or more COC optimization agents 270 may communicate with multiple COC analyzers 260 to cover the network. Further, the functions of the COC optimization agent 170 may be split between the core network 102 and the RAN 170.

Figure 5:
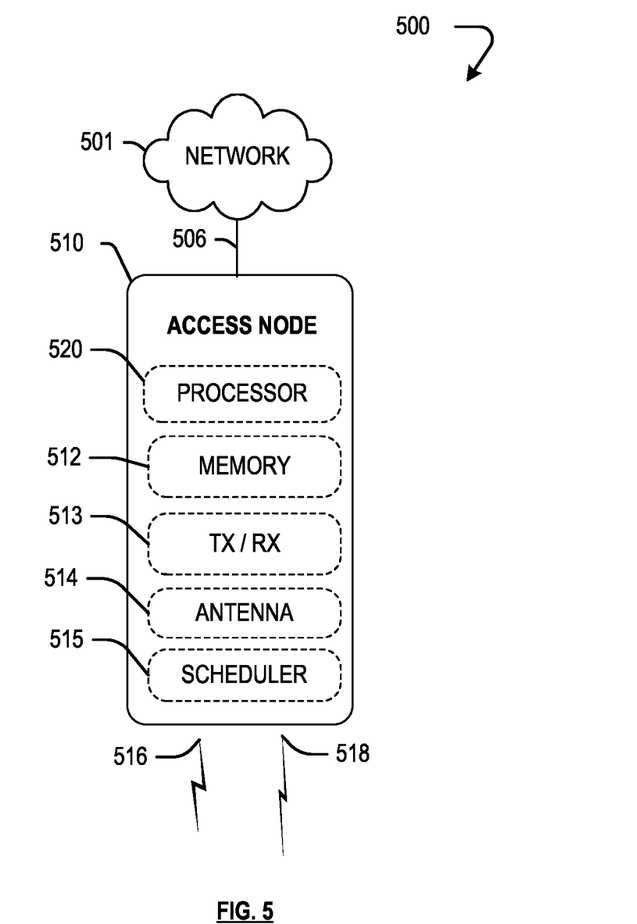
FIG. 5 depicts an access node for operation in conjunction with the cell outage compensation optimization system in accordance with the disclosed embodiments.

FIG. 5 illustrates an operating environment 500 for an exemplary access node 510 in accordance with the disclosed embodiments. In exemplary embodiments, the access node 510 communicates with the above-described SON 180 in order to transmit information that may be indicative of an outage The access node 510 can include, for example, a gNodeB or an eNodeB. In specific embodiments provided herein, the access node 510 is a gNB. Access node 510 may comprise, for example, a macro-cell access node, such as access node 110, 120, 130 described with reference to FIG. 1. Access node 510 is illustrated as comprising a processor 520, a memory 512, transceiver(s) 513, and antenna(s) 514. Processor 520 executes instructions stored on memory 512, while transceiver(s) 513 and antenna(s) 514 enable wireless communication with other network nodes, such as wireless devices and other nodes. For example, wireless devices may initiate uplink transmissions such that the transceivers 513 and antennas 514 receive messages including, for example, route information and performance parameters from the wireless devices, for example, over communication links 516 and 518. The transceivers 513 and antennas 514 may further pass the messages to a mobility entity in the core network. Further, the transceivers 513 and antennas 514 receive signals from the mobility entity such as a mobility management entity (MME) or access and mobility function (AMF) and pass the messages to the appropriate wireless device. Scheduler 515 may be provided for scheduling resources based on the presence and performance parameters of the wireless devices as well as based on policies transmitted from the core network. Network 501 may be similar to the network 101 discussed above with respect to FIG. 1.

In embodiments provided herein, processor 520 may operate in conjunction with the antennas 514 and transceivers 513 to communicate with wireless devices 122, 124, 126, and 128 and the core network 102. In operation, the processor 520 may execute instructions stored in the memory 512 to transmit information to the core network. In embodiments set forth herein, such information may be indicative of an outage or coverage failure. For example, these components may receive requests from the wireless devices 122, 124, 126, 128 and further may receive instructions, such as policies, from the core network 102 including the SON 180 and the COC optimization system 200. For example, the access node 510 may report network events, outages, or overloading to the core network 102. Such events could change the decisions being made at the COC optimization system 200. For example, if an access node 510 is overloaded, the COC optimization system 200 may filter this as a relevant event.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 and SON system 180 may be, comprise, or include computers systems and/or processing nodes, including access nodes, controller nodes, and gateway nodes described herein.

Figure 6:
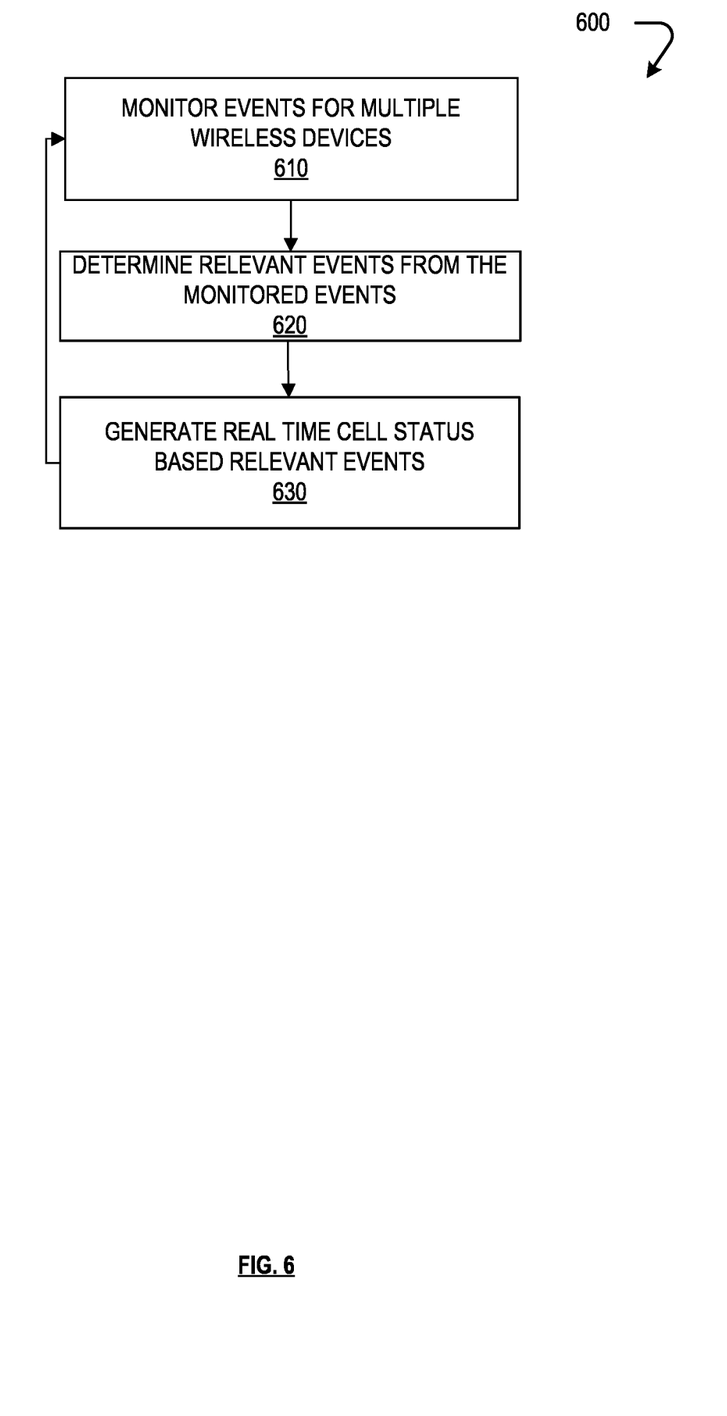
FIG. 6 is a flowchart depicting an exemplary method for cell outage compensation optimization in accordance with disclosed embodiments.

The disclosed methods for COC optimization are discussed further below. FIG. 6 illustrates an exemplary method 600 for achieving COC optimization. Method 600 may be performed by any suitable processor discussed herein, for example, a processor 310 included in the COC analyzer 260 or processor 410 included in the COC optimization agent 270, or a combination of both of these processors. For discussion purposes, as an example, method 600 is described as being performed by the COC optimization system 200.

Method 600 begins in step 610, when the COC optimization system 200 monitors events for multiple wireless devices 122, 124, 126, 128. The events may be reported by the wireless devices 122, 124, 126, 128, or the access nodes 110, 120, 130 and may be monitored by RAN probes or core probes (not shown) and forwarded to event services 250 of the core network. The COC optimization system 200 or more specifically, the COC analyzer 260 listens to the events reported to the event services platform 250. The events may include, for example, reports of performance parameters including one or more of SINR, RSRP, and RSRQ.

Based on stored instructions, the COC analyzer 260 determines relevant events from the monitored events in step 620. For example, while some events, such as poor signal quality or service interruptions may initially appear to be relevant, unless the interruptions cover all devices in a given area and are ongoing in real time, the event may be considered irrelevant and not indicative of an outage. However, if all devices within a certain region have lost connectivity for at least a predetermined period of time, the event may be deemed relevant.

In step 630, the COC optimization system 200 may generate a real time cell status. For example, the COC optimization system 200 may generate a real time cell status based on the access nodes 110, 120, and 130. Thus, if one access node experiences an outage, the COC optimization system 200 generates a real time cell status reflecting this outage. In operation, and as will be further described below, the COC analyzer 260 may forward the relevant events to the COC optimization agent 270 and the COC optimization agent 270 generates the real time cell status.

By continuously monitoring, filtering, and generating real time cell status in steps 610, 620, and 630, the COC optimization system 200 builds and refines intelligence for use by other components. For example, the intelligence developed by the COC optimization 200 may be utilized by the SON system 180 for self-healing processes.

Figure 7:
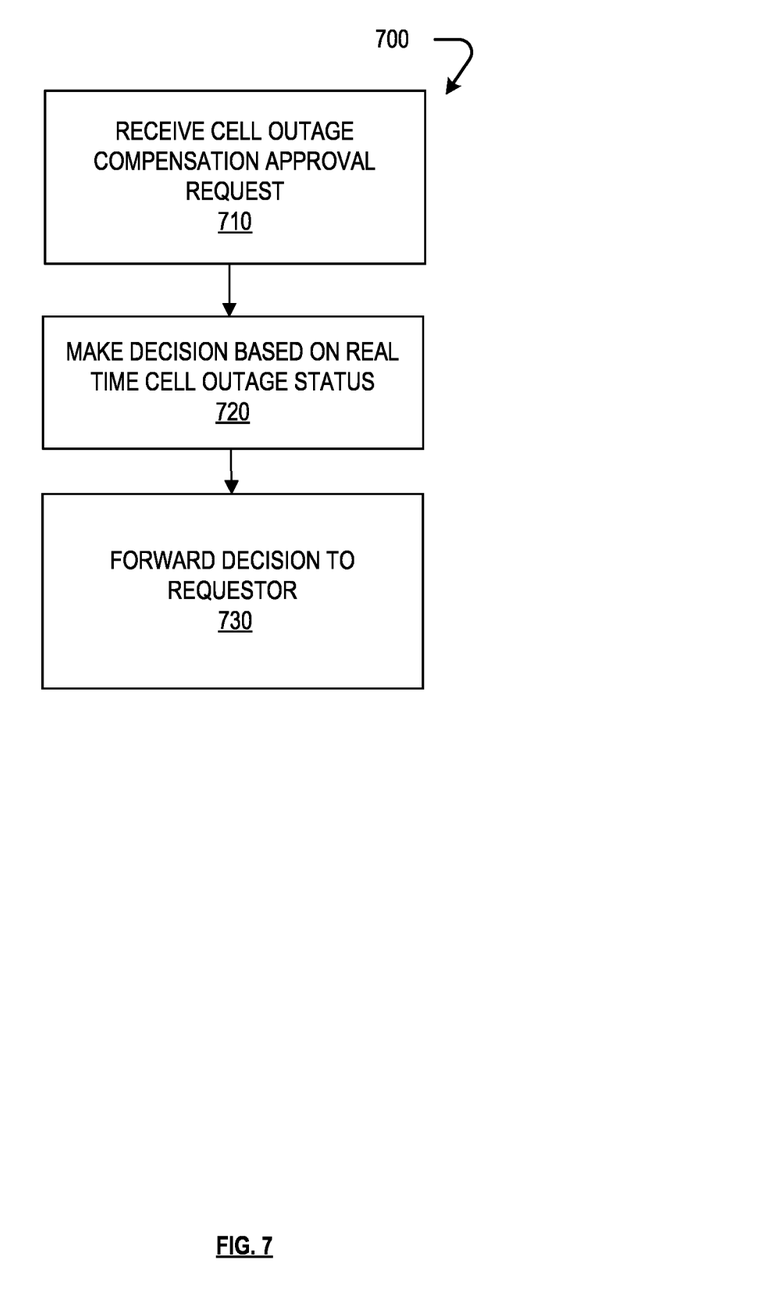
FIG. 7 is a flowchart depicting a further exemplary method for cell outage compensation optimization in accordance with disclosed embodiments.

FIG. 7 illustrates further details of COC optimization process in accordance with provided embodiments. Method 700 may be performed by any suitable processor discussed herein, for example, a processor 310 included in the COC analyzer 260 or processor 410 included in the COC optimization agent 270, or a combination of both of these processors. For discussion purposes, as an example, method 700 is described as being performed by the COC optimization system 200.

In step 710, the COC optimization system 200 receives a cell outage compensation approval request. For example, the COC scheduler 220 may generate a COC execution request for approval based on outage conditions reported by the performance platform 210. The events reported by the performance platform 210 may for example, be unfiltered and unverified events. Accordingly, upon receiving these unfiltered and unverified events, the COC scheduler 220 seeks permission from the COC optimization system 200 to perform outage compensation steps.

Thus, in step 720, the COC optimization system 200 makes a decision on the request from the COC scheduler 220. Because the COC optimization system 200 has filtered reported events and further has generated a real time outage status as described above with respect to FIG. 6, the COC optimization system 200 is positioned to intelligently evaluate the request from the COC scheduler 220. Based on the current real time outage status, the COC optimization system 200 may approve the request, reject the request, or approve a modified version of the request, for example, by approving a portion of the proposed compensation measures and rejecting another portion of the proposed compensation measures. For example, the COC optimization system 200 may determine that the outage no longer exists and reject the request because no compensation procedures are necessary. Alternatively, the COC optimization system 200 may determine that the transmission power of an access node should be increased, but that antenna tilt should not be adjusted. As a further alternative, the COC optimization system 200 may approve the request in its entirety and allow all compensation measures to be performed. These actions may be performed, for example, by the COC optimization agent 270.

In step 730, the COC optimization agent 270 forwards the decision to the requesting COC scheduler 220. The COC scheduler 220 may amend outage records based on the COC agent's decision and further notify the COC processor 230 so that appropriate action can be taken. If any compensation procedures are approved by the COC optimization agent 270, the COC processor 230 directs the element manager 240 to implement the compensation procedures.

As illustrated in FIGS. 6 and 7, methods may be implemented by the COC optimization system 200 to filter reported events, update real time outage status and make decisions on cell outage compensation requests. Accordingly, embodiments set forth herein may utilize the developed intelligence of the COC optimization system 200 to ensure that only necessary compensation procedures are implemented and further that the implemented compensation procedures will not detrimentally impact wireless device performance.

Figure 8:
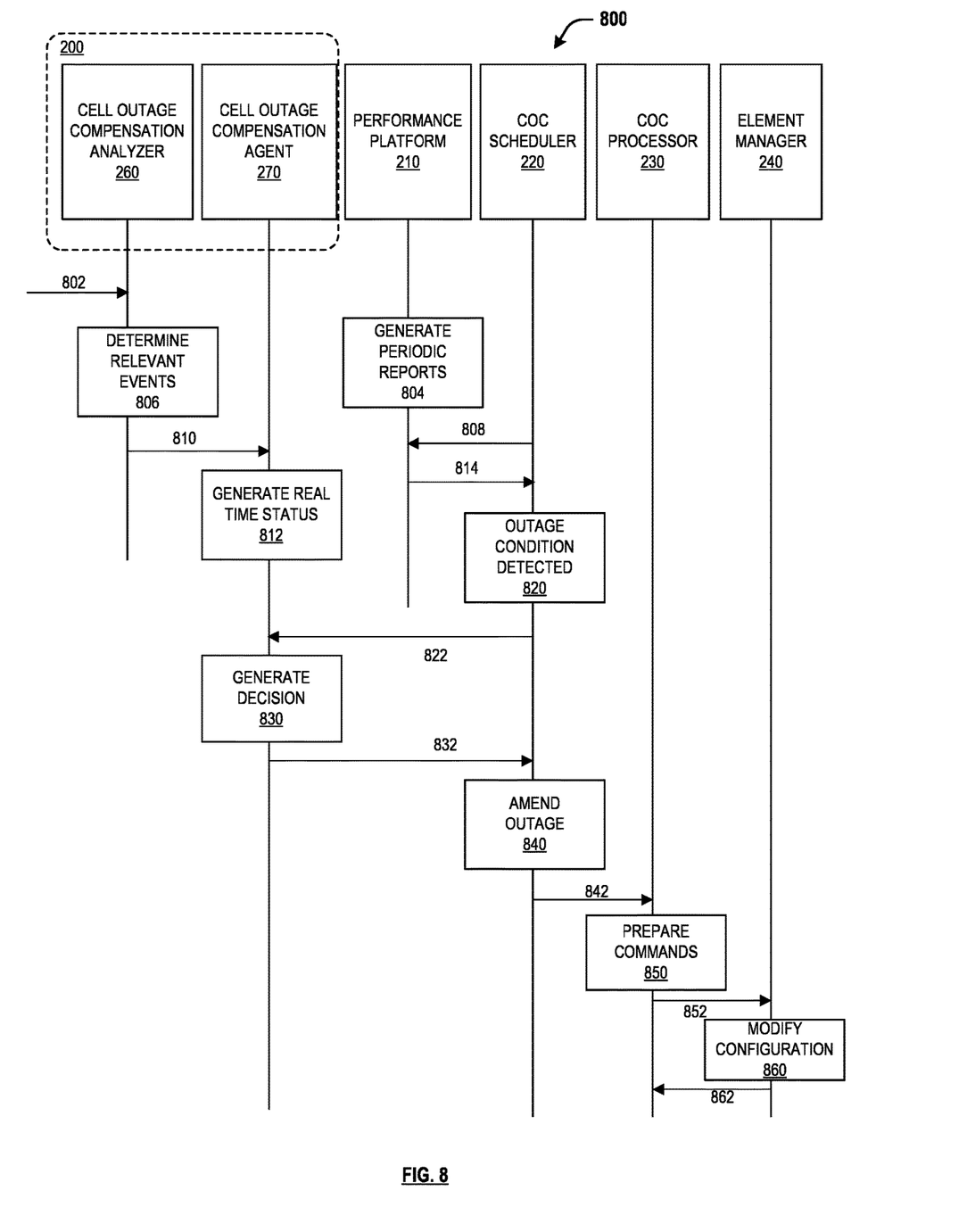
FIG. 8 is a flow diagram illustrating interaction of the cell outage compensation optimization system with additional components in accordance with disclosed embodiments.

FIG. 8 illustrates a method 800 for COC optimization showing the interaction of the COC optimization system 200 with other SON components including performance platform 210, COC scheduler 220, COC processor 230, and element manager 240. Not shown are RAN and core probes, which report to the event services 250 (FIG. 2). The method of FIG. 8 begins with the event services forwarding events to the COC analyzer 260 at step 802. Based on the received events at step 802, the COC analyzer 260 filters the received events to determine relevant events at step 806. The COC analyzer 260 forwards the relevant events to the COC optimization agent 270 at step 810. Upon receipt of the relevant events in step 810, the COC optimization agent 270 generates a real time outage status in step 812. The above-described processes occur continuously so that the COC optimization agent 270 always maintains a current real time outage status.

Simultaneously, SON components including a performance platform 210 generate periodic reports at step 804. The periodic reports are automatically generated based on performance parameters that are unfiltered for relevance to outages. The frequency of generation is not more than daily and the reports typically include snapshots of the network components. Accordingly, these automatically generated reports do not reflect real time status. At step 808, the COC scheduler 220 requests reports from the performance platform 210 and the COC scheduler 220 receives the reports at step 814. One such report indicates to the COC scheduler 220 whether any particular cell is found to be in an outage condition and the COC scheduler 220 determines the existence of an outage at step 820.

In embodiments set forth herein, the COC scheduler 220 is required to verify its detection of an outage condition based on the unfiltered reports with the COC optimization system 200. It should be noted that prior to the insertion of the COC optimization system 200, the COC scheduler operated in conjunction with the COC processor 230 to determine which cells to modify in an attempt to compensate for the reported outage. However, because the data and data interpretation were deficient, the COC process previously negatively impacted the service experience for a large number of customers. Without the data filtering and analysis described herein, the reconfiguration process was fed with corrupted, outdated, and/or incomplete data. With the insertion of the COC optimization system 200, both the data itself and analysis of the data are enhanced.

Thus, in step 822, the COC scheduler 220 requests COC execution approval from the COC optimization agent 270. Based on the real time outage status as determined in step 812, the COC optimization agent 270 renders a decision on the request in step 830. In step 832, the COC optimization agent 270 transmits its decision to the COC scheduler 220.

Based on the decision received from the COC optimization agent 270 in step 832, the COC scheduler 220 may amend the outage in step 840. In some cases, such as when the request is approved by the COC optimization agent 270 in its totality, step 840 is unnecessary. In any case, in step 842, the COC scheduler 220 sends a cell impact request to the COC processor 230 based on the directive of the COC optimization agent 270.

In response to the communication from the COC scheduler 220 in step 842, the COC processor 230 prepares commands for cell outage compensation in step 850 and forwards the commands to the element manager 240 in step 852. In step 860, the element manager 240 modifies the cell configuration in accordance with the commands and forwards the completed status to the COC processor 230 in step 862.

In order to develop a COCOA architecture and transform the existing COC processes, the COC optimization system 200 may have distributed instances and be set up for high-efficiency performance through filtering to focus on wireless device/RAN relationships. The process improves performance for real-time COC execution approvals, a.k.a. real-time second key approval, triggered by COC schedulers 220 that otherwise would have blindly processed a cell impact request without any consideration of an accurate real-time state.

In some embodiments, methods 600, 700, and 800 may include additional steps or operations. Furthermore, the methods may include steps shown in each of the other methods. As one of ordinary skill in the art would understand, the methods 600, 700, and 800 may be integrated in any useful manner and the steps may be performed in any useful sequence.

In some embodiments, methods 600, 700, and 800 may include additional or fewer steps or operations. Furthermore, the methods may include steps shown in each of the other methods. As one of ordinary skill in the art would understand, the methods 600, 700, and 800 may be integrated in any useful manner. Further, the order of the steps shown is merely exemplary and the order of steps may be rearranged in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
monitoring, by a first analyzer, events between wireless devices and an access node deploying a cell within a radio access network (RAN), the events generated by a RAN probe reporting to an event services platform of a self-organizing network (SON) and captured from the event services platform by the first analyzer;
determining, by the first analyzer, relevant events from the monitored events by filtering the monitored events, the relevant events indicative of a cell outage;
forwarding the relevant events from the first analyzer to a cell outage compensation (COC) optimization agent;
generating, at the COC optimization agent, a real time status of the cell based on the relevant events reported by the first analyzer to the COC optimization agent;
receiving an approval request for a network configuration change at the COC optimization agent from a COC scheduler in the SON, the approval request including at least one COC procedure, the COC scheduler formulating the approval request based on unfiltered events reported to the COC scheduler and detected from the event services platform; and
providing an approval from the COC optimization agent to the COC scheduler prior to allowing performance of COC procedures by the COC scheduler.

2. The method of claim 1, wherein the first analyzer is located in the RAN and receives the events generated by the RAN probe.

3. The method of claim 1, further comprising monitoring, by a second analyzer, events between a second access node and wireless devices within range of the second access node.

4. The method of claim 3, wherein the second analyzer forwards the relevant events to the COC optimization agent.

5. The method of claim 1, further comprising monitoring at a third analyzer located in a core network, events between multiple wireless devices and multiple access nodes.

6. The method of claim 5, further comprising determining by the third analyzer, relevant events from the monitored events, and forwarding the relevant events to the COC optimization agent within the core network.

7. The method of claim 5, wherein the third analyzer monitors events detected by a core network probe.

8. The method of claim 1, further comprising rejecting the approval request from the COC scheduler at the COC optimization agent upon determining, at the COC optimization agent, that the real time status of the network does not include an outage.

9. The method of claim 1, further comprising rejecting at least one proposed COC procedure of the approval request from the COC scheduler and approving at least one COC procedure of the approval request from the COC scheduler at the COC optimization agent.

10. A system comprising:
multiple distributed COC analyzers, each COC analyzer having a processor performing operations including;
monitoring events between wireless devices and an access node, the events generated by a RAN probe reporting to an event services platform of a self-organizing network (SON) system and captured from the event services platform by the multiple distributed COC analyzers; and
identifying relevant events from the monitored events by filtering the monitored events, the relevant events indicative of a cell outage; and
a COC optimization agent disposed within a core network, the COC optimization agent performing operations including;
receiving the relevant events from the COC analyzers;
generating a real time status based on the relevant events;
receiving an approval request for a network configuration change from a COC scheduler in the SON, the COC scheduler formulating the approval request based on unfiltered events reported to the COC scheduler and detected from the event services platform, the approval request including multiple COC procedures;
evaluating the approval request including requested COC procedures based on the real time status; and
providing a decision on the approval request to the COC scheduler prior to allowing performance of COC procedures by the COC scheduler.

11. The system of claim 10, wherein at least some of the multiple distributed COC analyzers receive event reports generated from RAN probes.

12. The system of claim 10, wherein at least one of the multiple distributed COC analyzers receives event reports generated from a core probe.

13. The system of claim 10, wherein the real time status includes a network outage status.

14. The system of claim 10, wherein the SON generates periodic reports based on unfiltered data.

15. The system of claim 10, wherein the decision comprises a full approval, a partial approval, or a denial in response to the request for COC procedures.

16. A method comprising:
providing, within a wireless network, multiple distributed cell outage compensation (COC) analyzers, each COC analyzer having a processor performing operations including:
monitoring events between wireless devices and an access node, the events generated by at least one RAN probe reporting to an event services platform of a self-organizing network (SON) and captured from the event services platform by the COC analyzers; and
identifying relevant events from the monitored events by filtering the monitored events, the relevant events indicative of a cell outage; and
providing a COC optimization agent disposed within a core network, the COC optimization agent including a processor performing operations including:
receiving the relevant events from the COC analyzers,
generating a real time status based on the relevant events reported by the COC analyzers to the COC optimization agent;
receiving an approval request for a network configuration change from a COC scheduler in the SON, the approval request including at least one COC procedure, the COC scheduler formulating the approval request based on unfiltered events reported to the COC scheduler and detected from the event services platform; and evaluating at least one COC procedure based on the real time status.

17. The method of claim 16, further comprising receiving, at the multiple distributed COC analyzers, events recorded by multiple RAN probes.

18. The method of claim 16, wherein the approval request includes multiple COC procedures.

19. The method of claim 18, further comprising sending, prior to allowing performance of COC procedures by the COC scheduler, a decision from the COC optimization agent in response to the approval request, the decision based on the evaluation.

20. The method of claim 19, wherein the decision comprises one of a full approval, a partial approval, or a denial in response to the requested COC procedures.

* * * * *